United States Patent [19]
Janse van Vuuren

[11] Patent Number: 5,690,065
[45] Date of Patent: Nov. 25, 1997

[54] METHOD AND DEVICE FOR OPTIMIZING AIR FILLING IN AN INTERNAL COMBUSTION ENGINE CYLINDER

[75] Inventor: Willem Nicolaas Janse van Vuuren, Tabb, Va.

[73] Assignee: Siemens Automotive S.A., Toulouse, France

[21] Appl. No.: 646,284

[22] PCT Filed: Nov. 3, 1994

[86] PCT No.: PCT/EP94/03617

§ 371 Date: May 10, 1996

§ 102(e) Date: May 10, 1996

[87] PCT Pub. No.: WO95/13458

PCT Pub. Date: May 18, 1995

[30] Foreign Application Priority Data

Nov. 10, 1993 [FR] France ................... 93 13436

[51] Int. Cl.⁶ .................. F01L 9/02; F02D 13/02; F02D 41/14; F02D 41/24
[52] U.S. Cl. ................... 123/90.16; 423/90.12; 423/90.15
[58] Field of Search ............. 123/90.12, 90.15, 123/90.16, 90.17

[56] References Cited

U.S. PATENT DOCUMENTS

| | | | |
|---|---|---|---|
| 4,133,332 | 1/1979 | Benson et al. | 123/198 F |
| 4,517,948 | 5/1985 | Kaji et al. | 123/489 |
| 4,615,306 | 10/1986 | Wakeman | 123/90.16 |
| 4,729,359 | 3/1988 | Tomisawa et al. | 123/440 |
| 4,796,573 | 1/1989 | Wakeman et al. | 123/90.16 |
| 4,995,351 | 2/1991 | Ohkubo et al. | 123/90.15 |
| 5,193,494 | 3/1993 | Sono et al. | 123/90.12 |
| 5,333,577 | 8/1994 | Shinojima | 123/90.15 |
| 5,482,012 | 1/1996 | Yoshioka | 123/90.15 |
| 5,611,304 | 3/1997 | Shinojima | 123/90.15 |

FOREIGN PATENT DOCUMENTS 0368675  5/1990  European Pat. Off. .

OTHER PUBLICATIONS

Vehicle Electronics in the 90's: Proceedings of the International Congress on Transportation Electronics, (BEHR) pp. 325–333; Oct. 1990.

*Primary Examiner*—Weilun Lo
*Attorney, Agent, or Firm*—Herbert L. Lerner; Laurence A. Greenberg

[57] ABSTRACT

A value ($RFD_{tab}$) of a lag in the closure of an intake valve (2) associated with the cylinder ($4_1$), as a function of the engine speed (N), is obtained from a table, and the closure of this valve (2) is controlled as a function of this lag. During operation at a stabilized speed under a heavy load, the applied closure lag is gradually varied from the stored value in steps ($\epsilon$), the load of the cylinder is measured and compared before and after each successive step, and the stored value ($RFA_{tab}$) of the lag is updated when a comparison reveals an increase in said load, until a maximum for the latter is detected.

7 Claims, 2 Drawing Sheets

METHOD AND DEVICE FOR OPTIMIZING AIR FILLING IN AN INTERNAL COMBUSTION ENGINE CYLINDER

BACKGROUND OF THE INVENTION

FIELD OF THE INVENTION

The present invention relates to a process for optimizing the air filling of an internal combustion engine cylinder under a heavy load and, more specifically, to a process of this type implemented with the aid of means which make it possible to vary the instant at which an intake valve associated with this cylinder closes. The object of the present invention is also to provide a device for implementing this process.

Conventionally, the "lift" of an intake or exhaust valve is controlled by a cam which is interdependent with the crankshaft of the engine or with a camshaft which rotates in sync with the crankshaft. The mechanical link established between each valve and the associated control cam is desmodromic, and the "events" which are constituted by the opening or closing of the valve occur at predetermined, invariable moments in the operating cycle of the engine, or "engine cycle."

It is currently proposed that these events be made to occur in a controlled, variable way, in order to adjust, for example, the quantity of air or air/fuel mixture taken in by a cylinder of the engine, or even the quantity of combustion gas retained in this cylinder.

This presupposes the availability of means which make it possible to control the "lift" of the valves with the requisite flexibility, a flexibility which is absent from the conventional cam mechanisms. Electromechanical devices, for example with electromagnets, and mechanohydraulic devices such as that schematically shown in FIG. 1 in the appended drawing, have been specifically designed for this purpose.

The latter device comprises, as shown, a conventional cam 1 which acts on a valve 2 through a chamber 3 which is fixed in relation to the engine 4, which has four cylinders $4_1$, $4_2$, $4_3$, $4_4$, for example. The chamber 3 is filled with a liquid under pressure such as the lubricating oil for the engine, delivered by an oil pump 5 through a conduit 6 equipped with a nonreturn valve 7.

The chamber 3 is closed by two end pistons 8 and 9. The piston 8 is normally loaded against the cam 1 by the oil pressure established in the chamber. The valve 2 is interdependent with the piston 9, and loaded against a seat provided in the associated cylinder $4_1$ by a spring 10 which is powerful enough so that the oil pressure in the chamber 9 alone can not cause a "lift" of the valve. A two-way solenoid valve 11 with two positions makes it possible to control the oil pressure in the chamber, by selectively connecting it to a tank 12 out in the open. Devices of this type are well known, and further details related to them could be obtained by referring to U.S. Pat. Nos. 4,133,332; 4,615,306; and 4,796,573.

The operation of the mechanism shown in FIG. 1 is described as follows: When the solenoid valve 11 is driven to be in the position shown in the figure, the chamber 3 is disconnected from the tank 12 and the nonreturn valve 6 prevents any backflow of oil toward the conduit 6. The incompressibility of the oil contained in the chamber 3 results in the transmission of the displacements of the piston 8, under the pressure from the cam 1, to the piston 9 and to the valve 2. Therefore this valve is subject to the displacements imposed on it by the cam 1. If the solenoid valve is driven so as to connect the chamber 3 with the tank 12, the pressure in this chamber drops and the chamber empties, at least partially, into the tank when the cam 1 causes the piston 8 to descend. At this point there is no longer a transmission of the displacements of the piston 8 to the valve, which remains in its seat in the closed position.

It is understood that by controlling the excitation of the solenoid valve in the appropriate way, it is possible to vary the instants at which the valve 2 opens and closes, since the mechanism described has a short response time which is compatible with the duration of the operating cycles of the engine, even at high speed.

This control presupposes that a computer 13 associated with the engine generates and delivers, to another computer 14 for controlling the lift of the valve, a set-point value $\alpha_c$ which indicates, for example, the angular position of the crankshaft at which a controlled "valve event," such as the opening or closing or this valve, must occur. Modern automobiles are usually equipped with an ignition and/or injection computer, fed by sensors of the angle of the crankshaft $\alpha_{vil}$ and/or of the engine speed N, the pressure P in the intake manifold of the engine, the temperature T of the coolant, the position Ac of the accelerator pedal, etc., for generating controls for the ignition-advance angle A, the opening time $t_1$ of a fuel injector, etc. A computer of this type, labelled 13 in FIG. 1, is therefore capable of generating, from certain signals received from the above-mentioned sensors, particularly from the signal representing the engine speed, the above mentioned setpoint value $\alpha_c$ which indicates the angular position of the crankshaft at which the opening or closing of the valve must occur, in accordance with one or more strategies, stored in the computer and executed by it, for adjusting the quantity of air taken in by a cylinder during the opening time of an intake valve of this cylinder.

One of these strategies consists of controlling the value $\alpha_c$ of the angular position of the crankshaft at which the closure of the intake valve must occur, under a heavy engine load. What is meant by "load" is the quantity of air or air/fuel mixture introduced into the cylinders of the engine in each of its operating cycles. This quantity is a function of the "filling" of the cylinders, or the "volumetric efficiency", in the English expression, that is, the engine's capacity to function as a pump, a capacity which varies as a function of different dynamic effects such as the pressure wave propagation in the intake manifold and the cylinders, which are a function of the engine speed. It is clear that there is an advantage to optimizing the torque which an engine can produce at a given speed. For this reason, it is necessary to optimize the "filling" of the cylinders of the engine, since it is clear that torque is a function of the energy obtained from the combustion of the air/fuel mixture contained in the cylinders.

In FIG. 2 of the appended drawing, the graph of the conventional "lift" of an intake valve, as a function of the corresponding angular position of the crankshaft of the engine, is represented by a solid line. The angular positions of a top dead center (PMH) and a bottom dead center (PMB) of a piston operating in an associated cylinder, during the intake stroke of a cylinder which is part of a four-stroke internal combustion engine for example, are also indicated. Thanks to the variable valve lift control device shown in FIG. 1, it is possible to vary the open $\alpha_o$ and closed $\alpha_f$ positions of the intake valve. Thus it was possible to determine that, in order to 0 optimize the filling of the cylinder, the angle $\alpha_f$ would have to vary between a position near the bottom dead center (PMB) at low speed and a position lagging by a closure lag RFA which is proportionally greater when advancing to high speeds corresponding to heavy loads.

In this case, it is possible to consider saving, in a table in a memory 15 of the computer 13, various values for a closure lag $RFA_{tab}$ as a function of the engine speed N, with electronic control means 16 in this computer polling this memory during the calculation of the set-point angle $\alpha_c$ for the closure of this valve.

Unfortunately, a solution of this type is not satisfactory from the point of view of "robustness," since it does not allow the adaptation of the table of the lags RFA to each unit of a mass-produced engine when these units have different characteristics due to manufacturing tolerances, nor does it allow the adaptation of this table to the aging of each engine.

The object of the present invention is to provide a process and a device for optimizing the air filling of an internal combustion engine cylinder under a heavy load which does not have these drawbacks.

These objects of the invention, as well as others which will become apparent through a reading of the description which follows, are achieved by means of a process in which a value of a lag in the closure of an intake valve associated with a cylinder, as a function of the engine speed, is obtained from a stored table, and the closure of this valve is controlled as a function of this lag, which process is remarkable in that, during operation at a stabilized speed under a heavy load, the applied closure lag is gradually varied from the stored value in steps, the load of the cylinder is measured and compared before and after each successive step, and the stored value of the lag is updated when a comparison reveals an increase in this load, until a maximum for the latter is detected.

A procedure of this type for updating the table of values of the lag in the closure of the intake valve, executed periodically for example, makes it possible to store the values of the lag which take into account the specific characteristics of each unit of a mass produced engine, as well as the specific aging of each engine.

In order for the process according to the invention to be implemented, the invention provides a device which comprises means for the variable lift control of an intake valve of an internal combustion engine cylinder, and storage means loaded with the values of a lag in the closure of this valve under a heavy load, as a function of the engine speed, which device also comprises a sensor which delivers a signal representing the load on the engine, means for delivering a signal representing the full opening of the throttle valve, means sensitive to this signal of the full opening for controlling, at a stabilized engine speed under a heavy load, a gradual variation in steps of the closure lag applied to the valve, for comparing the loads measured by the load sensor before and after each successive step of the variation, and for updating the stored value of the lag to the current stabilized speed when these comparison means detect an increase in the load measured, until a maximum for it is detected.

Other characteristics and advantages of the present invention will become apparent through a reading of the description which follows and an examination of the appended drawing in which:

DESCRIPTION OF THE PREFERRED EMBODIMENTS

Figure 1:
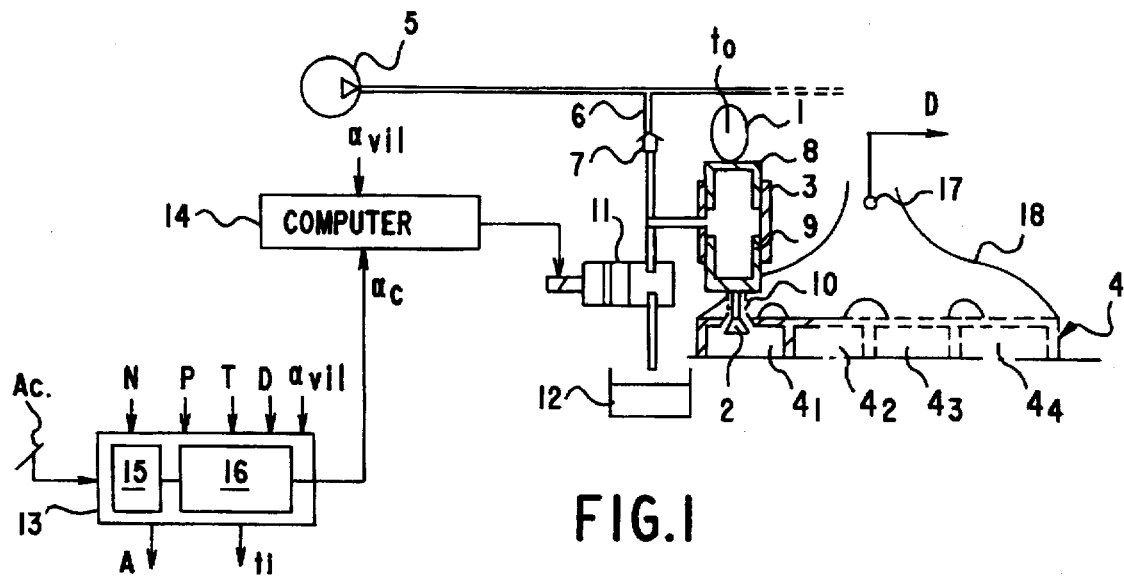
FIG. 1 schematically shows a device for implementing the process according to the invention, which has already been partially described in the introductory portion of the present description.
Figure 2:
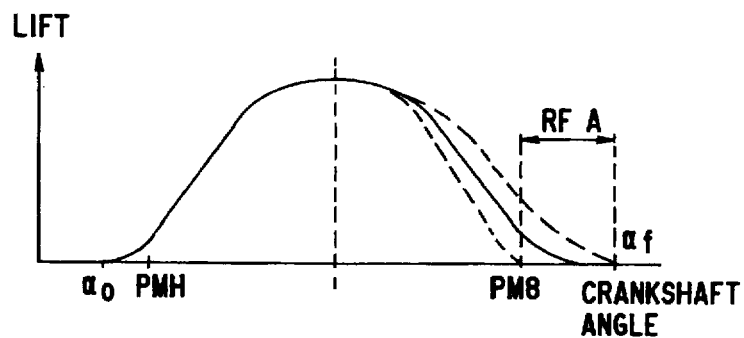
FIG. 2 is a graph described in the introductory portion.
Figure 3:
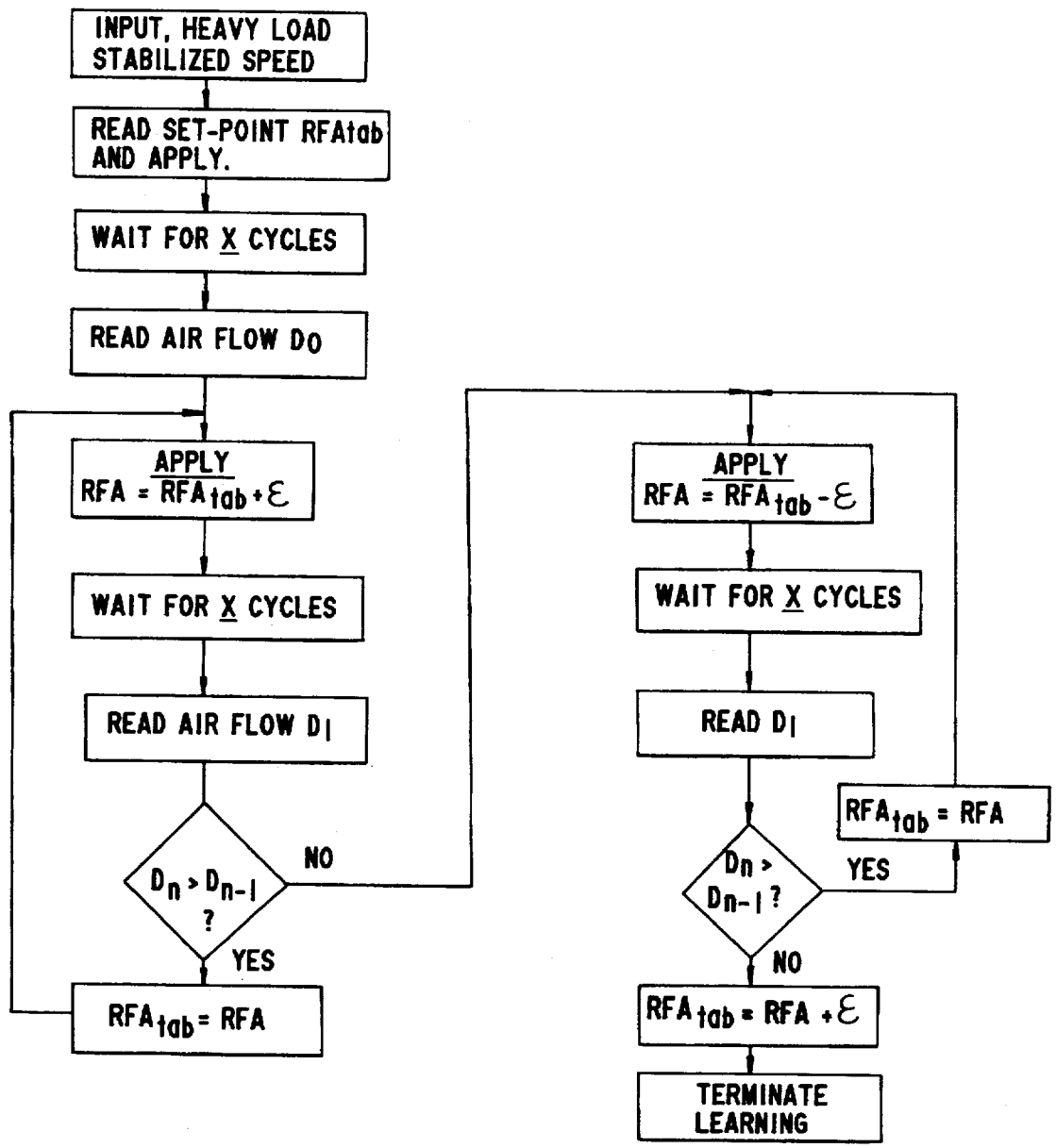
FIG. 3 is a flow chart of the optimization process according to the invention.

Refer to FIG. 3 of the appended drawing, in which the flow chart shown is advantageously that of a program executed by the electronic calculation means 16 in the computer 13. The input into the program is determined by the appearance and detection of the operation of the engine 4 under a heavy load, at a stabilized engine speed N. The appearance of these conditions is determined by the computer based on the signals received from a conventional sensor of the speed N and a sensor which emits a signal representing the full opening of the throttle valve, for example a "foot to the floor" contact or a value of the signal of the depression of the accelerator pedal $A_c$ which is greater than a predetermined threshold. The load level at which the load is considered to be "heavy" by the process according to the invention could be chosen by one skilled in the art from measurements taken at the test bench, for example.

Once the conditions for implementing the optimization process according to the invention are recognized by the electronic means 16, these means poll the memory 15 to obtain the value of the closure lag $RFA_{tab}$ to be taken into account in the calculation of the set-point value $\alpha_c$ of the angular position of the closure of the valve, at the speed N measured. The electronic means then emit a set-point value $\alpha_c$ which includes the closure lag read in the stored table. The electronic means 16 then read a signal representing the load on the engine, for example the air flow $D_o$ measured by a flow sensor 17 placed in the intake manifold 18 of the engine, after a delay in stabilizing this flow, counted in engine cycles, for example. The number x of engine cycles will be chosen in accordance with observations made during testing as to the time required for the stabilization of the air flow intake, in the absence of any appreciable variation in the engine speed.

After this reading of the air flow $D_o$, the program proceeds with an incrementation of the lag taken into account in the calculation of the set-point $\alpha_c$, namely:

$$RFA = RFA_{tab} + \epsilon$$

in which $\epsilon$ is an increment whose evaluation is within the scope of the knowledge of one skilled in the art. The electronic means 16 then read the air flow $D_i$ (i=1) measured by the sensor 17, after a delay in stabilizing this flow of x engine cycles. The electronic means 16 then execute a test based on the comparison of the flows $D_1$ and $D_0$. If the flow $D_1$ is smaller than $D_0$, it means that the desired increase in the flow cannot be achieved through an incrementation of the lag RFA. The program then decrements the lag from the stored value read and the electronic calculation means 16 then take into account, in the calculation of the angular position of the closure of the intake valve, the lag:

$$RFA = RFA_{tab} - \epsilon$$

After the application of the position calculated in this way, and the passage of x engine cycles for stabilization, the electronic means read the flow D fed by the sensor 17 and compares this flow to the flow $D_o$ observed after the initial application of the lag $RFA_{tab}$. If no increase in flow is observed, it means that the applied lag is indeed that which ensures the maximum flow D. The stored value $RFA_{tab}$ is then confirmed and the program for "learning" the value RFA to be saved in memory is terminated.

If the incrementation of the value RFA applied previously causes the appearance of an increase in the flow, there is an updating of the value $RFA_{tab}$ in memory and a wraparound to a new incrementation of RFA, with a corresponding incrementation of the stored value, until no further increase in the flow is observed.

The program applies a similar wraparound and updating strategy in the case of a decrementation in the value RFA described above, which appears in the flow chart in FIG. 3.

The program for learning the value $RFA_{tab}$ can be executed automatically throughout the "life" of the engine, with a frequency which is consistent with an accurate monitoring of the changes in its characteristics, in order to constantly ensure the optimization of the air filling of the engine under a heavy load, and therefore of the torque it delivers. The adaptation of the stored values of the lag $RFA_{tab}$ to the particular characteristics of the engine and to the changes in these characteristics caused by the aging of the engine is therefore properly ensured.

It is understood that the invention is not limited to the embodiment described and illustrated, which was given only by way of example. Thus, the monitoring of the "filling" of the cylinder of the engine could be ensured by sensors other than a flow meter, for example a sensor of the torque output by the engine, or even a pressure sensor associated with each combustion chamber. Likewise, the procedure for optimizing the lag according to the invention could be adapted by one skilled in the art to "valve events" other than the angular position of the closure of an intake valve.

Incidentally, it will be noted that the invention lends itself advantageously to implementation by means of an injection and/or ignition computer 13 which operates by means of a "flow-speed" mapping rather than a "pressure-speed" mapping in the system, since in this case it is possible to dispense with the pressure sensor in the intake manifold of the engine.

I claim:

1. A method of optimizing air supply into an internal combustion engine cylinder, wherein the cylinder has an intake valve associated therewith and the engine is subject to heavy load conditions, the method which comprises:

reading from a stored table a stored value of a lag in the closure of the intake valve associated with the cylinder, as a function of the engine speed;

during operation of the engine at a stabilized speed under a heavy load, gradually varying an applied closure lag from the stored value of the lag in steps;

measuring the load of the cylinder and comparing the respective loads before and after each successive step;

updating the stored value of the lag when a comparison reveals an increase in the load, until a maximum for the load is detected; and controlling the closure of the intake valve with the applied closure lag derived from the stored value of the lag.

2. In combination with an internal combustion engine having a cylinder, an intake valve associated therewith, and a lifter for lifting the intake valve in a controlled fashion, a device for optimizing an air supply into the cylinder of the internal combustion engine, the device comprising:

a lifter control for variably controlling the lifter; a memory in which values of a closure lag for closing the intake valve under a heavy load are stored as a function of the engine speed; a load sensor sensing a load on the engine and issuing a load signal representing the load on the engine; means for issuing an opening signal representing a full opening of a throttle valve of the engine; and a control apparatus for controlling said lifter control, said control apparatus receiving the load signal from said load sensor and receiving the opening signal, said control apparatus including:

means for gradually varying, at a stabilized engine speed under a heavy load, a closure lag applied to the intake valve in steps;

comparison means for comparing the respective loads measured by said load sensor before and after each successive step in the variation; and means for updating the stored value of the lag to the current stabilized speed, when the comparison means indicate an increase in the measured load.

3. The device according to claim 2, wherein the engine includes an air intake manifold, and said load sensor is a flow meter disposed in the air intake manifold.

4. The device according to claim 2, wherein the engine includes an output shaft, and said load sensor is a torque sensor sensing an available torque on the output shaft.

5. The device according to claim 2, wherein said control apparatus includes electronic means for calculating a closed position of the intake valve, and said means for gradually varying are software means integrated in said electronic means for calculating the closed position of the valve.

6. The device according to claim 5, wherein the engine includes a computer for calculating at least one of an ignition-advance angle and a fuel injection timing, said electronic means being integrated in said computer of the internal combustion engine.

7. In combination with an internal combustion engine having a cylinder, an intake valve associated therewith, and a lifter for lifting the intake valve in a controlled fashion, a device for optimizing an air supply into the cylinder of the internal combustion engine, the device comprising:

a lifter control for variably controlling the lifter; a memory in which values of a closure lag for closing the intake valve under a heavy load are stored as a function of the engine speed; a load sensor sensing a load on the engine and issuing a load signal representing the load on the engine; means for issuing an opening signal representing a full opening of a throttle valve of the engine; and a control apparatus for controlling said lifter control, said control apparatus receiving the load signal from said load sensor and receiving the opening signal, and said control apparatus being programmed to:

at a stabilized engine speed under a heavy load, gradually vary a closure lag applied to the intake valve in steps;

compare the respective loads measured by said load sensor before and after each successive step in the gradual variation; and update the stored value of the lag to the current stabilized speed, when the comparison of the loads indicates an increase in the measured load, until a load maximum is detected.

* * * * *